Figure 1:
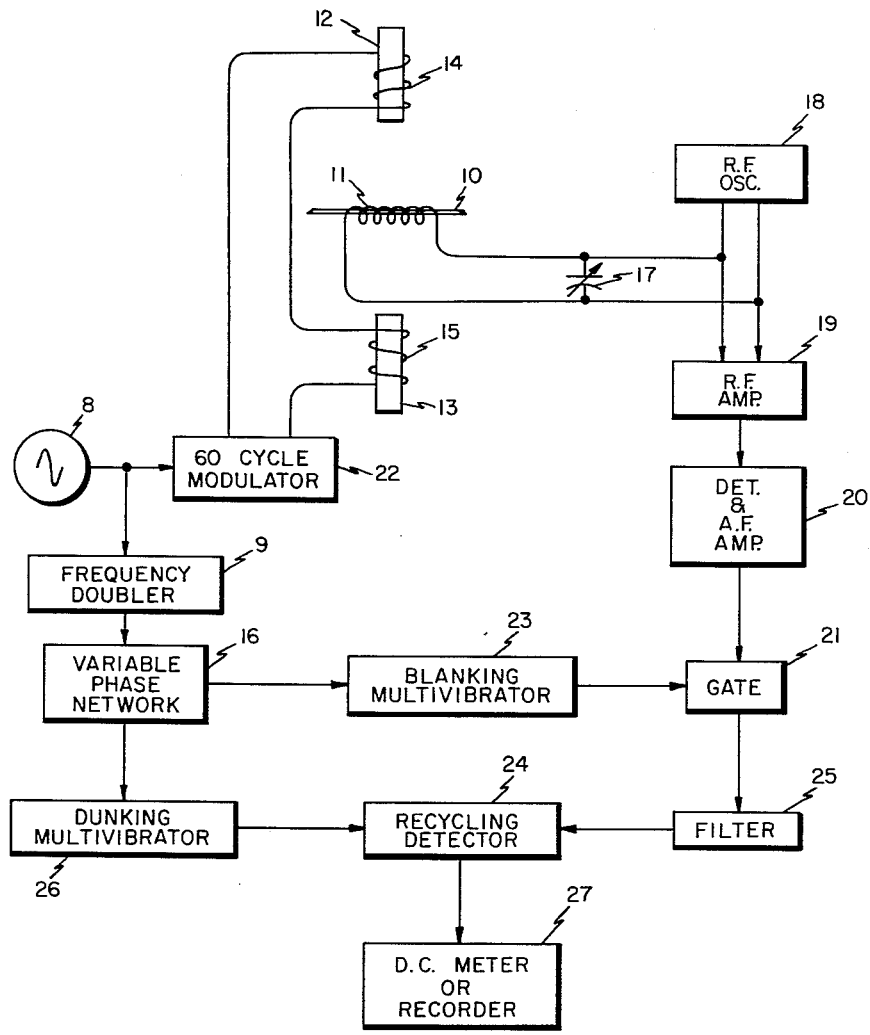

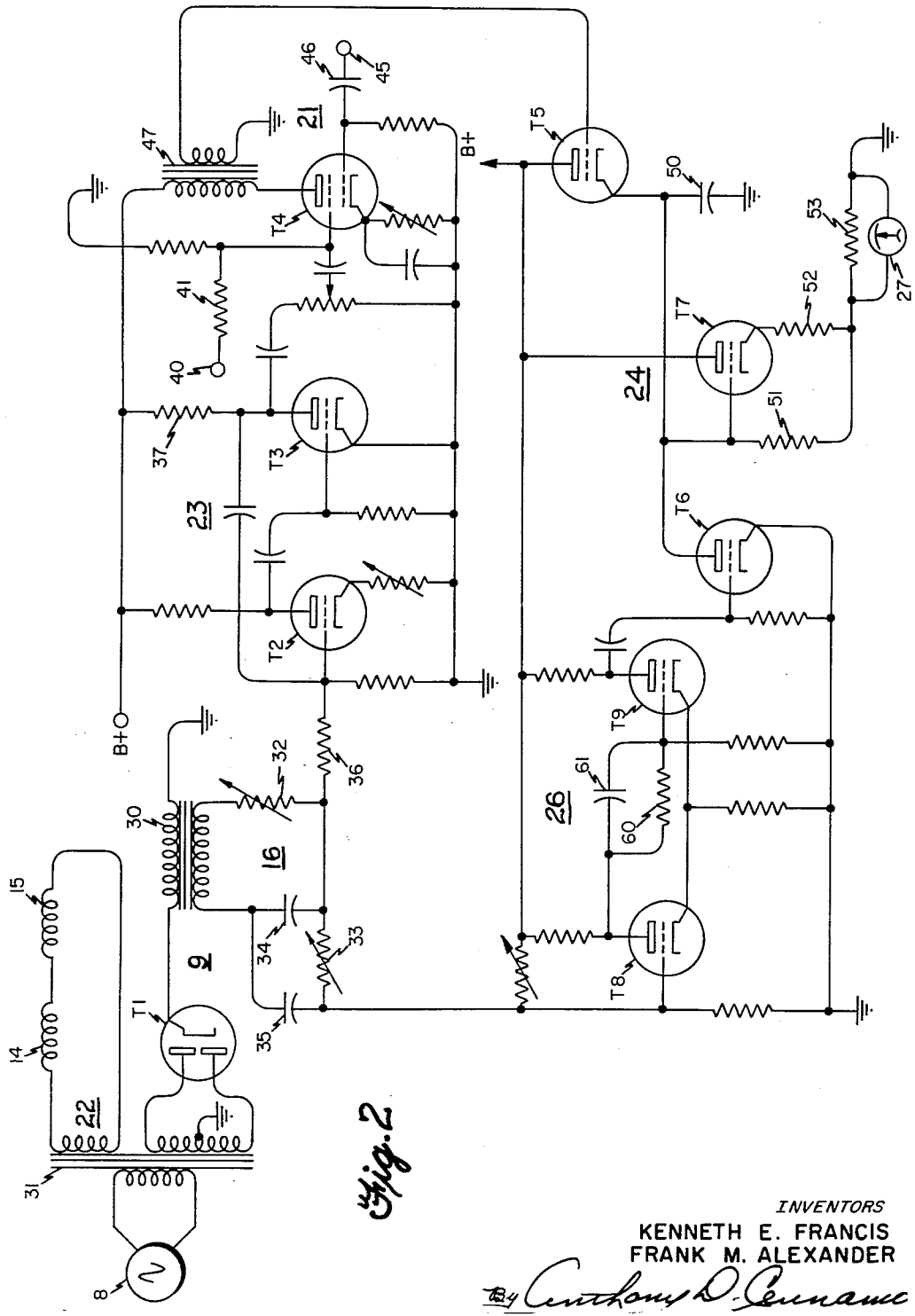

United States Patent Office 2,999,976
Patented Sept. 12, 1961

2,999,976
NUCLEAR MAGNETIC RESONANCE MEASURING AND CONTROL DEVICE
Kenneth E. Francis, Worthington, and Frank M. Alexander, Columbus, Ohio, assignors to Industrial Nucleonics Corporation, a corporation of Ohio
Filed Mar. 3, 1958, Ser. No. 718,894
7 Claims. (Cl. 324—.5)

This invention relates to nuclear magnetic resonance measuring and control apparatus, and in particular to readout means that is adapted to actuate a low impedance indicator responsive to the peak voltage of a nuclear absorption signal.

It is well known in the prior art relating to nuclear physics that many atomic nuclei possess magnetic moment and nuclear momentum or "spin." A nucleus having these characteristics displays gyroscopic effects and is therefore often considered analogous to a spinning gyroscope having a magnet positioned along its axis.

When such nuclei are subjected to a unidirectional magnetic field, the spinning nuclei initially tend to precess around an axis parallel to the magnetic field. After a period of time, damping forces suppress the nuclear precession enabling the nuclear moments to line up with the magnetic field. In the event the polarized nuclei are subjected to a radio-frequency field at right angles to the magnetic field, nuclear precession is again initiated.

Prior investigators have studied the gyroscopic properties of nuclei by subjecting an element to a magnetic field produced by a permanent magnet and simultaneously irradiating the element with radio-frequency energy emanating from a tank coil. When the frequency of the radio-frequency source resonates with the frequency of nuclear precession, the spinning nuclei absorb a maximum amount of energy from the radio-frequency field thereby loading the tank circuit. It has been determined that the resonant frequency of nuclear precession varies for different elements and for different values of the polarizing magnetic field.

Within recent years, measuring devices have been proposed operative in response to the energy absorption occurring at the nuclear magnetic resonance frequency. From this absorption measurement, the relative proportion of an element in question can be determined because the total energy absorbed is a function of the number of nuclei present. Apparatus of this type can be used for the quantitative determination of any element the nucleus of which possesses angular momentum and magnetic moment, such as for example, hydrogen, helium, lithium, beryllium, boron, and nitrogen. Additionally, quantitative determination of various isotopes of elements can also be made, because in many cases the different isotopes have different resonant frequencies.

The absorption phenomenon of nuclear magnetic resonance is also used to measure constituent proportions in various compounds. For example, moisture content measurements can be made in materials, such as tobacco or paper. In such a determination the water content is not measured directly but, rather, indirectly by the amount of hydrogen present. By applying the same principles it is possible to measure the presence of any compound which contains at least one element the nucleus of which possesses angular momentum and magnetic moment.

In conventional nuclear magnetic resonance apparatus, radio-frequency current from a constant-current source is supplied to a parallel tuned circuit consisting of a coil and capacitor. The tank coil is placed within the uniform field of a permanent magnet so that the radio-frequency field is perpendicular to the magnetic field, and the material to be measured is placed within the coil.

The radio-frequency field, or the magnetic field, is modulated at a slow audio rate. When the radio-frequency and the magnetic fields satisfy the relation $\omega = \gamma H_0$, where "$\omega$" is the angular velocity of the radio frequency field, "$H_0$" is the permanent magnetic field strength in gauss, and "$\gamma$" is a constant dependent on the type of nucleus subjected to resonance, nuclear magnetic resonance occurs.

The resulting energy absorption causes a decrease in the impedance of the tank circuit, and therefore a decrease in the voltage appearing across the tank circuit. For a given set of conditions the magnitude of this change in voltage is proportional to the amount of absorbing substance present so that a quantitative measurement can be made.

For purposes of analysis, the voltage appearing across the tank circuit may be considered as an amplitude-modulated radio-frequency carrier. In order that the amplitude of the modulation components can be used for a quantitative measurement of the substance under test, appropriate apparatus must be connected to the tank circuit. This apparatus includes amplifier and detector stages, incorporating electronic components.

In the usual arrangement, the modulated voltage across the tank circuit is applied to a radio-frequency amplifier tuned to the carrier frequency. The output of this amplifier is in turn applied to an audio detector so that the modulated carrier may be demodulated. The audio output of the detector is in turn amplified in an audio amplifier and thereafter applied to a readout device which may be an oscilloscope.

In many applications it is desirable to effect circuit readout with a low impedance device, such as a direct-current meter or recorder in lieu of a relatively cumbersome and space consuming oscilloscope.

Accordingly, a principal object of this invention is to provide nuclear magnetic resonance readout means that employs a low impedance direct-current meter or recorder.

Another object of the invention is to provide readout means for nuclear magnetic resonance apparatus that is accurate in its indication and substantially nonresponsive to circuit noise.

Another object of the invention is to provide low impedance readout means for nuclear magnetic resonance apparatus that is responsive to the peak amplitude variations occurring in a sequence of absorption pulses.

A preferred embodiment of the readout circuit of this invention comprises a low impedance meter or recorder that is energized by the output signal developed from a recycling detector. This detector includes a peak voltage amplifier having a peak voltage charging capacitor and a cathode-follower amplifier driven by the voltage across the capacitor. A sequence of audio pulses corresponding to the periodic occurrence of the resonance phenomenon is applied to the input of the recycling detector through an electronic gate. This electronic gate is so actuated that all input signals to the recycling detector are rejected except during the short time intervals within which the absorption pulses are periodically applied to the input of the recycling detector. Each applied audio absorption pulse charges the capacitor to a voltage proportional to the peak voltage of the absorption pulse. This capacitor voltage is in turn applied to the input of the cathode-follower amplifier, and the output of the amplifier drives a direct-current meter or recorder having a low impedance.

In order that the voltage appearing across the charge capacitor may be responsive to changes in the peak amplitude of the audio absorption pulses, multivibrator actuated means discharges the capacitor during each time interval between consecutive audio pulses. This enables the cathode-follower amplifier to generate a sequence of identical length square-wave pulses in which each square-wave pulse has an amplitude proportional to its generating audio pulse. The output indicator is therefore responsive to peak amplitude values.

In order that all of the features for attaining the objects of this invention may be readily understood, reference is herein made to the drawings wherein:

FIG. 1 is a block diagram of a preferred embodiment of the readout circuit of this invention associated with conventional nuclear magnetic resonance measuring apparatus; and FIG. 2 is a schematic circuit diagram for the readout circuit of FIG. 1.

Referring now to FIG. 1, material 10 under test is positioned in the center of radio-frequency sampling coil 11, and is thereby subjected to a radio-frequency field parallel to the longitudinal axis of coil 11. Material 10 is also subjected to a transverse magnetic field developed in the gap between permanent magnets 12 and 13. Modulation coils 14 and 15 envelop the pole ends of magnets 12 and 13, respectively, so that the otherwise steady magnetic field is amplitude modulated by the audio-frequency energy supplied from modulated source 16.

Capacitor 17 shunts coil 11 so that the combination 11—17 forms a parallel-resonant tank circuit connected to the output of constant-current radio-frequency oscillator 18. The tank circuit is tuned to the oscillator frequency and therefore a substantial radio-frequency voltage appears across the combination 11—17. This voltage has a constant amplitude except during those periodic instances at which the output frequency of oscillator 18 and the modulated magnetic field generated by magnets 12 and 13 and modulation coils 14 and 15 satisfy the requirements for nuclear resonance.

During resonance, material 10 absorbs energy from the radio-frequency field so as to periodically load coil 11. As is well known, the loading of a parallel tank circuit lowers the "Q" of the tank, thereby reducing the parallel impedance appearing across the tank circuit. The periodic absorption of energy by material 10 thus amplitude modulates the radio-frequency voltage appearing across tank circuit 11—17. The amplitude of this modulation component varies in accordance with the number of nuclei present in the material 10 to absorb energy from tank coil 11.

The voltage appearing across tank circuit 11—17 is applied to the input of radio-frequency amplifier 19. The signal output of radio-frequency amplifier 19 is in turn applied to the input of detector and audio-frequency amplifier 20 which has an output connected to electronic gate 21.

Modulation source 22 coupled to a source 8 of 60 cycle alternating current applies a 60 cycle alternating current to coils 14 and 15. A condition of nuclear resonance occurs 120 times per second, and therefore the detector and audio-frequency amplifier unit 20 applies a periodic sequence of pulses at this rate to the input of gate 21.

A frequency doubler 9, likewise connected to A.C. source 8, is coupled to a variable phase network 16 which triggers a blanking multivibrator 23 so that a gating voltage is applied to gate 21 only during the time interval that an audio pulse is applied to the gate. All of the random noise between consecutive audio pulses is blanked by gate 21. The output of gate 21 is applied to recycling detector 24 through a narrow bandpass amplifier 25. The bandpass amplifier is optional. It is preferably included, however, to further improve the signal-to-noise ratio of the readout circuit.

Recycling detector 24 develops a periodic sequence of square waves at its output each of which has an amplitude proportional to the amplitude of the driving audio pulse. As will be hereinafter set forth in detail, the recycling detector includes a peak voltage amplifier having a capacitor whose charge voltage energizes a cathode-follower amplifier.

Dunking multivibrator 26 is triggered by another voltage from the phase network 16 so that the charge capacitor of the peak voltage amplifier is discharged in the time interval between consecutively applied audio pulses. This discharging function is required so that each output pulse of the recycling detector 24 is responsive to the peak amplitude of the driving audio pulse. The output signal of the recycling detector 24 is applied to a direct-current meter or detector 27.

Referring now to the circuit diagram of FIG. 2, frequency doubler 9 comprises vacuum tube T1, transformer 30 and associated components. The primary of line transformer 31 is energized by 115 volt, 60 cycle, alternating current shown generally at 8; and the center-tapped secondary voltage of this transformer is applied to both anodes of full-wave rectifier tube T1. Accordingly, the primary winding of transformer 30 connected in the cathode circuit of rectifier tube T1 is energized at a 120 cycle rate.

A variable phasing network 16 comprising potentiometers 32 and 33 and capacitors 34 and 35 is connected across the secondary of transformer 30. A phase of the secondary voltage developed by transformer 30 and the phasing network connected thereto is applied through resistor 36 to the control grid of tube T2. Tubes T2 and T3 and associated components form a conventional monostable multivibrator 23 that is triggered at a 120 cycle rate by the trigger voltage applied to the control grid of tube T2.

A square wave periodic sequence appears across plate load resistor 37 of vacuum tube T3. This square wave output may be shifted from 0° to 180° by varying the relative values of potentiometers 32 and 33. The circuit component values of blanking multivibrator 23 are preferably adjusted to give about a one millisecond positive square wave at the plate of tube T3. This time length is adequate to enable electronic gate 21 to just pass an applied absorption pulse.

Tube T4 and associated components comprise the electronic gate 21 (FIG. 1). A negative voltage connected to terminal 40 is applied to the suppressor grid of tube T4 through resistor 41. This voltage is sufficiently negative to prevent tube T4 from conducting until the positively directed square wave developed in the plate circuit of tube T3 appears at the suppressor grid of tube T4.

The audio absorption pulse sequence appearing at the output of detector and audio-frequency amplifier 20 (FIG. 1) is applied between terminal 45 and ground. These pulses are applied to the control grid of gating tube T4 through coupling capacitor 46. A plate signal is developed in the primary winding of transformer 47 when the control grid of tube T4 is driven and the negative bias of suppressor grid T4 is overcome by a trigger pulse from multivibrator 23. The phase of the multivibrator gating signal applied to tube T4 must therefore be adjusted by potentiometer 32 so that a square wave will appear at the suppressor grid in time coincidence with the audio absorption signal appearing at the control grid of tube T4.

The primary winding of transformer 47 is energized only during the time that an absorption signal is received. The time is approximately one millisecond. All of the random noise between each absorption pulse is rejected by an approximate 7.3 millisecond blanking time interval. The only noise appearing at the anode of tube T4 is the noise that rides the peak of the audio absorption signal. The signal applied to the primary winding of transformer 47 is therefore suitable for peak detection inasmuch as there is no random noise between signals.

Tubes T5, T6 and T7 comprise the recycling detector 24 shown in FIG. 1. Tube T5 forms a peak voltage amplifier having a peak voltage charge capacitor 50 connected in the cathode circuit. The control grid of tube T5 is connected to the secondary winding of transformer 47 so that tube T5 is driven by the output signal of the gating tube T4. Capacitor 50 charges to a peak voltage proportional to the input voltage applied to the control grid of tube T5.

Tube T7 and associated components comprise a conventional cathode-follower amplifier in which the grid-return resistor 51 is connected to an intermediate tap between cathode resistors 52 and 53 so as to reduce the negative grid bias applied to this tube. It should be understood, however, that variations in the specific arrangement of the cathode-follower can be made as desired, the essential requirement being that the input of the cathode-follower present a very high impedance to charge capacitor 50 so as not to discharge the capacitor. A low impedance direct-current meter or recorder 27 is connected to the output of the cathode-follower amplifier.

Tubes T8 and T9 and associated components comprise a conventional monostable multivibrator that corresponds to the dunking multivibrator 26 of FIG. 1. This multivibrator is triggered from another phase of 120 cycle voltage generated by the network 32, 33, 34 and 35 connected to the secondary winding of transformer 31. This voltage is taken from the junction terminal between potentiometer 33 and capacitor 35 and is applied to the control grid of tube T8. The phase of this voltage may be adjusted by varying the value of potentiometer 33. The short time constant of resistor 60 and capacitor 61, interconnecting the anode of tube T8 to the control grid of tube T9, produces a sharp pulse in the anode circuit of tube T9 which is applied to the control grid of tube T6. This pulse is a dunking pulse which causes tube T6 to conduct and thus establish a low impedance discharge path for capacitor 50.

The phase of monostable vibrator 26 is adjusted so that the dunking pulse occurs immediately before the application of an audio absorption pulse to the control grid of peak amplifier tube T5. Accordingly, a sequence of square waves having a uniform time length appears at the output of cathode-follower tube T7. The amplitude of each of these square waves is proportional to the amplitude of the audio pulse applied to tube T5 that generated the square wave. The voltage applied to meter or recorder 27 is therefore proportional to the peak value of the audio absorption signal applied to terminal 45 from detector and audio-frequency amplifier 20.

It should be understood that the above-described arrangements are merely illustrative of the principles of this invention, and that structural modifications can be made without departing from the scope of the invention.

What is claimed is:

1. In nuclear magnetic resonance measuring apparatus for subjecting a material to be analyzed to mutually perpendicular magnetic and radio-frequency fields including a resonant tank circuit developing a radio-frequency signal that is amplitude modulated in response to periodic conditions of nuclear resonance between the fields and for the material being measured and an audio-frequency detector developing an audio pulse in response to each occurrence of nuclear resonance, the improvement comprising a recycling detector including a peak voltage amplifier having a peak voltage charging capacitor and a cathode-follower amplifier driven by the voltage across said capacitor, an electronic gate interconnecting said audio detector and peak voltage amplifier, an alternating-current source modulating the intensity of said magnetic field so that the frequency of periodic resonance corresponds with the frequency of said alternating-current source, a first multivibrator triggered by said alternating-current source and applying a gating voltage to said electronic gate during each occurrence of resonance to charge said capacitor of said peak voltage amplifier to a voltage proportional to the peak amplitude of each of said audio pulses, an electronic vacuum tube having an anode-cathode space path shunting said capacitor and a cathode-control grid space path normally biased to prevent discharging of said capacitor, a second multivibrator triggered by said alternating-current source to overcome the bias of said vacuum tube at a time intermediate the application of consecutive audio pulses to said peak voltage amplifier to thereby discharge said capacitor, and readout means connected to the lower impedance output of said cathode-follower amplifier.

2. In nuclear magnetic resonance measuring apparatus for subjecting a material to be analyzed to mutually perpendicular magnetic and radio-frequency fields including a resonant tank circuit developing a radio-frequency signal that is amplitude modulated in response to periodic conditions of nuclear resonance between the fields and for the material being measured and an audio-frequency detector developing an audio pulse in response to each occurrence of nuclear resonance, the improvement comprising a recycling detector including a peak voltage amplifier having a peak voltage charging capacitor and a cathode-follower amplifier driven by the voltage across said capacitor, an electronic gate interconnecting said audio detector and peak voltage amplifier, an alternating-current source modulating said magnetic field, a first multivibrator triggered by said alternating-current source and energizing said electronic gate so that each periodic audio pulse is applied to said peak voltage amplifier and the signal portions between adjacent pulses are rejected, means triggered by said alternating-current source to discharge said capacitor between consecutive pulses applied to said peak voltage amplifier, and a low impedance indicator actuated by the output of said cathode-follower amplifier.

3. In nuclear magnetic resonance measuring apparatus for subjecting a material to be analyzed to mutually perpendicular magnetic and radio-frequency fields including a resonant tank circuit developing a radio-frequency signal that is amplitude modulated in response to periodic conditions of nuclear resonance between the fields and for the material being measured and an audio-frequency detector developing an audio pulse in response to each occurrence of nuclear resonance, the improvement comprising a recycling detector including a peak voltage amplifier having a peak voltage charging capacitor and a cathode-follower amplifier driven by the voltage across said capacitor, an electronic gate applying each periodic audio pulse to said peak amplifier and rejecting the signal portions between consecutive pulses, means discharging said capacitor between consecutive pulses applied to said peak voltage amplifier, and low impedance readout means connected to the output of said cathode-follower amplifier.

4. In nuclear magnetic resonance measuring apparatus for subjecting a material to be analyzed to mutually perpendicular magnetic and radio-frequency fields including a resonant tank circuit developing a radio-frequency signal that is amplitude modulated in response to periodic conditions of nuclear resonance between the fields and for the material being measured and an audio-frequency detector developing an audio pulse in response to each occurrence of nuclear resonance, the improvement comprising a recycling detector including a peak voltage amplifier having a peak voltage charging network and a cathode-follower amplifier driven by the voltage across said network, an electronic gate applying each periodic audio pulse to said peak amplifier and rejecting the signal portions between adjacent pulses, means deactivating said network between consecutive pulses applied to said peak voltage amplifier, and low impedance means connected to the output of said cathode-follower amplifier.

5. In nuclear magnetic resonance measuring apparatus for subjecting a material to be analyzed to mutually perpendicular magnetic and radio-frequency fields including a resonant tank circuit developing a radio-frequency signal that is amplitude modulated in response to periodic conditions of nuclear resonance between the fields and for the material being measured and an audio-frequency detector developing an audio pulse in response to each occurrence of nuclear resonance, the improvement comprising a recycling detector including a peak voltage amplifier having a peak voltage charging capacitor and a second amplifier having a high impedance input circuit and a low impedance output circuit driven by the voltage across said capacitor, an electronic gate applying each periodic audio pulse to said peak amplifier and rejecting the signal portions between adjacent pulses, means discharging said capacitor between consecutive pulses applied to said peak voltage amplifier, and low impedance readout means connected to the output of said second amplifier.

6. In nuclear magnetic resonance measuring apparatus for subjecting a material to be analyzed to mutually perpendicular magnetic and radio-frequency fields including a resonant tank circuit developing a radio-frequency signal that is amplitude modulated in response to periodic conditions of nuclear resonance between the fields and for the material being measured and an audio-frequency detector developing an audio pulse in response to each occurrence of nuclear resonance, the improvement comprising a recycling detector including a peak voltage amplifier and a second amplifier having a high impedance input circuit and a low impedance output circuit, an electronic gate applying each periodic audio pulse to said peak amplifier and rejecting the signal portions between adjacent pulses, means deactivating the output of said peak amplifier between consecutive pulses applied to said peak voltage amplifier, and low impedance readout means connected to the output of said second amplifier.

7. In nuclear magnetic resonance measuring apparatus for subjecting a material to be analyzed to mutually perpendicular magnetic and radio-frequency fields including a resonant tank circuit developing a radio-frequency signal that is amplitude modulated in response to periodic conditions of nuclear resonance between the fields and for the material being measured and an audio-frequency detector developing an audio pulse in response to each occurrence of nuclear resonance, the improvement comprising means selectively amplifying each such audio pulse and rejecting the detector output signal occurring during the time intervals between consecutive audio pulses, means generating a pulse of square waveform for each of said audio pulses and having an amplitude directly proportional to the peak amplitude of the corresponding audio pulse, a cathode-follower amplifier having a high impedance input circuit driven by said sequence of square waves, and low impedance readout means connected to the output of said cathode-follower amplifier.

References Cited in the file of this patent

UNITED STATES PATENTS

| Re. 23,950 | Bloch et al. | Feb. 22, 1955 |
| 2,708,736 | Creveling et al. | May 11, 1955 |
| 2,795,653 | McCoy | June 11, 1957 |

OTHER REFERENCES

Volkoff et al.: Canadian Journal of Physics, vol. 30, No. 3, 1952, pp. 270 to 289.

Waugh: Article entitled "Nuclear Dipole Interactions," Annals of the New York Academy of Sciences, vol. 7, Article 4, June 1948, pp. 920–923.